US010216040B2

(12) United States Patent
Kim et al.

(10) Patent No.: US 10,216,040 B2
(45) Date of Patent: Feb. 26, 2019

(54) CHOLESTERIC LIQUID CRYSTAL REFLECTIVE POLARIZING PLATE AND LIQUID CRYSTAL DISPLAY INCLUDING THE SAME

(71) Applicant: SAMSUNG DISPLAY CO., LTD., Yongin, Gyeonggi-do (KR)

(72) Inventors: Ji Hye Kim, Hwaseong-si (KR); Kwang Hyun Kim, Gunpo-si (KR); Sang Jae Kim, Seoul (KR); Teck Soo Kim, Seongnam-si (KR); Gwan Young Na, Yongin-si (KR); Hyoung Joo Lee, Seoul (KR); Seon Ah Cho, Busan (KR); Hyo Sung Hong, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 612 days.

(21) Appl. No.: 14/726,313

(22) Filed: May 29, 2015

(65) Prior Publication Data
US 2016/0223730 A1    Aug. 4, 2016

(30) Foreign Application Priority Data

Feb. 4, 2015   (KR) .................. 10-2015-0017116

(51) Int. Cl.
*G02F 1/1335* (2006.01)
*G02F 1/13363* (2006.01)
*G02B 5/30* (2006.01)

(52) U.S. Cl.
CPC ....... *G02F 1/13363* (2013.01); *G02B 5/3016* (2013.01); *G02B 5/3083* (2013.01); *G02F 1/13362* (2013.01); *G02F 1/133536* (2013.01); *G02F 2001/133541* (2013.01); *G02F 2001/133543* (2013.01); *G02F 2001/133638* (2013.01)

(58) Field of Classification Search
CPC ... G02F 1/133536; G02F 2001/133543; G02F 2001/133638; G02F 2001/133541; G02F 1/13362; G02B 5/3016; G02B 5/3066
See application file for complete search history.

(56) References Cited

U.S. PATENT DOCUMENTS 5,221,982 A *  6/1993  Faris ................. G02B 5/30
                                              348/E9.027
5,327,285 A *  7/1994  Faris ................. G02B 27/0093
                                              348/E5.141
(Continued)

FOREIGN PATENT DOCUMENTS

KR    10-2002-0026364    4/2002
KR    10-2003-0026765    4/2003
(Continued)

*Primary Examiner* — Paisley L Arendt
(74) *Attorney, Agent, or Firm* — F. Chau & Associates, LLC

(57) ABSTRACT

A cholesteric liquid crystal reflective polarizing plate includes a cholesteric liquid crystal layer and a λ/4 compensation layer disposed on the cholesteric liquid crystal layer. The cholesteric liquid crystal layer includes a first left-handed circularly polarizing portion which extends in a first direction that include a left-handed cholesteric liquid crystal material, and a first right-handed circularly polarizing portion which extends in the first direction adjacent to first left-handed circularly polarizing portion and that includes a right-handed cholesteric liquid crystal material. The λ/4 compensation layer includes a first λ/4 compensation pattern which extends in the first direction and overlapping the first left-handed circularly polarizing portion, and a second λ/4 compensation pattern which extends in the first direction adjacent to the first λ/4 compensation pattern and overlaps the first right-handed circularly polarizing (Continued)

portion. The first λ/4 compensation pattern and the second λ/4 compensation pattern have slow axes perpendicular to each other.

12 Claims, 6 Drawing Sheets

(56) References Cited

U.S. PATENT DOCUMENTS

| | | | | |
|---|---|---|---|---|
| 7,564,518 | B2* | 7/2009 | Ma | G02F 1/13718 349/113 |
| 7,969,541 | B2* | 6/2011 | Okuyama | B29D 11/00644 349/117 |
| 8,300,183 | B2* | 10/2012 | Ma | G02F 1/13718 349/106 |
| 8,749,743 | B2* | 6/2014 | Jang | G02F 1/13718 349/139 |
| 2016/0109630 | A1* | 4/2016 | Ichihashi | C09K 19/54 250/338.1 |

FOREIGN PATENT DOCUMENTS

| | | |
|---|---|---|
| KR | 10-2003-0061659 | 7/2003 |
| KR | 10-2010-0070681 | 6/2010 |
| KR | 10-2012-0122434 | 11/2012 |
| KR | 10-2014-0070789 | 6/2014 |

\* cited by examiner

CHOLESTERIC LIQUID CRYSTAL REFLECTIVE POLARIZING PLATE AND LIQUID CRYSTAL DISPLAY INCLUDING THE SAME This application claims priority under 35 U.S.C. § 119 from Korean Patent Application No. 10-2015-0017116 filed on Feb. 4, 2015 in the Korean Intellectual Property Office, and all the benefits accruing therefrom, the contents of which are herein incorporated by reference in their entirety.

BACKGROUND

1. Technical Field

Embodiments of the present disclosure are directed to a cholesteric liquid crystal reflective polarizing plate and a liquid crystal display (LCD) including the same.

2. Discussion of the Related Art

Liquid crystal displays (LCDs) are widely utilized as popular image display devices. However, despite many excellent characteristics, LCDs have a narrow viewing angle.

In the case of early LCDs, an image appeared distorted when viewed from a side angle due to a narrow viewing angle. However, current LCDs can provide a certain level of image quality using a phase-difference film even when viewed from a side angle. Further, the development of lateral electric field driving technology has led to the introduction of a liquid crystal mode that has a wide viewing angle without using a phase-difference film. Therefore, it has become possible to provide image quality that is superior to that of early LCDs by combining a wide-viewing angle liquid crystal mode and a phase-difference film.

In addition, attempts have been made to further increase the luminance of LCDs. To this end, a luminance enhancement film, such as a reflective polarizing plate, may be used with LCDs.

However, since phase differences of optical devices used in an LCD have different values as a function of wavelength, wavelength dispersion should be taken into consideration to achieve a perfect black state without light leakage. In addition, if a reflective polarizing plate is used with large-screen LCDs, image quality can further be degraded, causing stains to be observed.

In particular, if a reflective polarizing plate is used to improve luminance, entirely different phase characteristics can be exhibited. Accordingly, a phase-difference film of an LCD may need to be redesigned to have the desired phase characteristics.

SUMMARY

Embodiments of the present disclosure can improve display quality by suppressing wavelength-selective reflection characteristics using a reflective polarizing plate or film.

Embodiments of the present disclosure can provide a display device having a high-luminance and a wide viewing angle due to a reflective polarizing plate.

However, features of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment of the present disclosure, there is provided a cholesteric liquid crystal reflective polarizing plate comprising a cholesteric liquid crystal layer and a $\lambda/4$ compensation layer disposed on the cholesteric liquid crystal layer, wherein the cholesteric liquid crystal layer comprises a first left-handed circularly polarizing portion which extends in a first direction and comprises a left-handed cholesteric liquid crystal material, and a first right-handed circularly polarizing portion which extends in the first direction adjacent to first left-handed circularly polarizing portion and comprises a right-handed cholesteric liquid crystal material, and the $\lambda/4$ compensation layer comprises a first $\lambda/4$ compensation pattern which extends in the first direction and overlaps the first left-handed circularly polarizing portion and a second $\lambda/4$ compensation pattern which extends in the first direction adjacent to the first $\lambda/4$ compensation pattern and overlaps the first right-handed circularly polarizing portion, wherein the first $\lambda/4$ compensation pattern and the second $\lambda/4$ compensation pattern have slow axes that are perpendicular to each other.

According to another aspect of the present disclosure, there is provided a liquid crystal display (LCD) that includes a backlight unit for providing light having a mixture of a left-circularly polarized component and a right-circularly polarized component, a first polarizing plate disposed on the backlight unit, a display substrate disposed on the first polarizing plate, a liquid crystal layer disposed on the display substrate, a counter substrate disposed on the liquid crystal layer and a second polarizing plate disposed on the counter substrate, wherein the first polarizing plate includes a cholesteric liquid crystal layer and a $\lambda/4$ compensation layer disposed on the cholesteric liquid crystal layer, wherein the cholesteric liquid crystal layer includes a first left-handed circularly polarizing portion which extends in a first direction and comprises a left-handed cholesteric liquid crystal material, and a first right-handed circularly polarizing portion which extends in the first direction adjacent to first left-handed circularly polarizing portion and includes a right-handed cholesteric liquid material, and the $\lambda/4$ compensation layer comprises a first $\lambda/4$ compensation pattern which extends in the first direction and overlaps the first left-handed circularly polarizing portion, and a second $\lambda/4$ compensation pattern which extends in the first direction direction adjacent to the first $\lambda/4$ compensation pattern and overlaps the first right-handed circularly polarizing portion, wherein the first $\lambda/4$ compensation pattern and the second $\lambda/4$ compensation pattern have slow axes that are perpendicular to each other.

According to another aspect of the present disclosure, there is provided a cholesteric liquid crystal reflective polarizing plate that includes a cholesteric liquid crystal layer; and a $\lambda/4$ compensation layer which is disposed on the cholesteric liquid crystal layer, wherein the cholesteric liquid crystal layer includes a first left-handed circularly polarizing portion which extends in a first direction, and a first right-handed circularly polarizing portion adjacent to first left-handed circularly polarizing portion which extends in the first, and the $\lambda/4$ compensation layer comprises a first $\lambda/4$ compensation pattern which extends in the first direction and overlaps the first left-handed circularly polarizing portion, and a second $\lambda/4$ compensation pattern adjacent to the first $\lambda/4$ compensation pattern which extends in the first direction and overlaps the first right-handed circularly polarizing portion. Light that transmits through the first left-handed circularly polarizing portion is right-circularly polarized light, light that transmits through the first right-handed circularly polarizing portion is left-circularly polarized light, the right-circularly polarized light is provided to the first $\lambda/4$ compensation pattern, and the left-circularly polarized light is provided to the second $\lambda/4$ compensation pattern, wherein light that transmits through the first λ/4 compensation pattern and light that transmits through the second λ/4 compensation pattern are linearly polarized light that oscillate in a same direction.

DETAILED DESCRIPTION OF EXEMPLARY EMBODIMENTS

Figure 1:
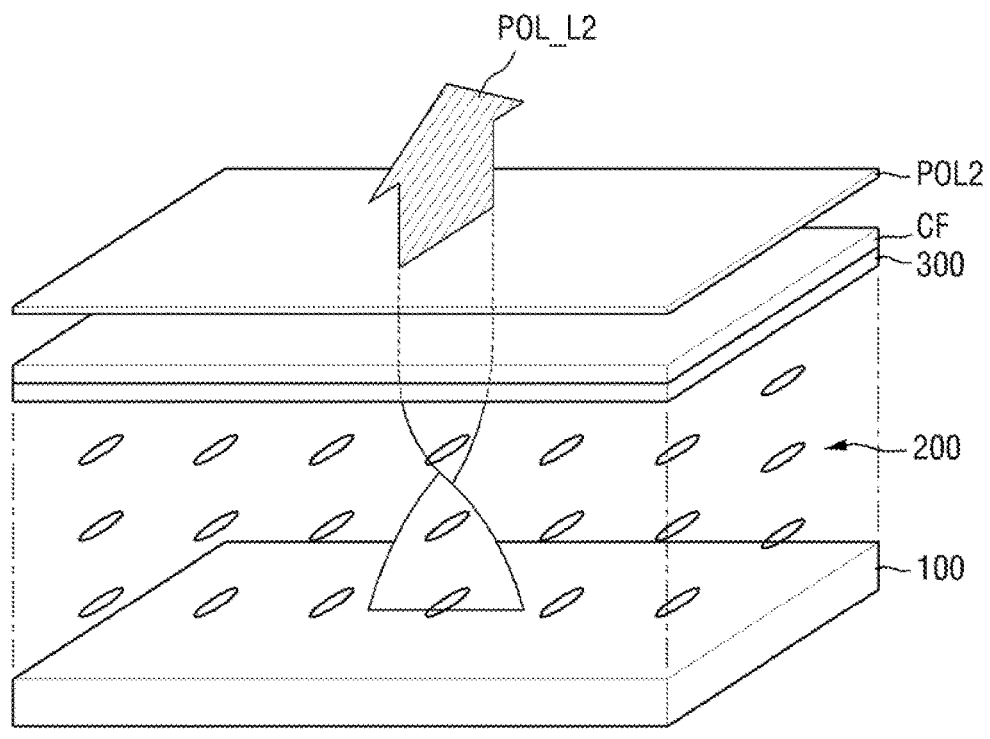
FIG. 1 is a schematic exploded perspective view of a display device according to an embodiment of the present disclosure.

Features of the present disclosure and methods for achieving the features will be apparent by referring to the embodiments to be described in detail with reference to the accompanying drawings. However, the present disclosure is not limited to the embodiments disclosed hereinafter, but can be implemented in diverse forms.

The term "on" that is used to designate that an element is on another element or located on a different layer or a layer includes both a case where an element is located directly on another element or a layer and a case where an element is located on another element via another layer or still another element. In the entire description of the present disclosure, the same drawing reference numerals may be used for the same elements across various figures.

The present disclosure will now be described more fully with reference to the accompanying drawings, in which exemplary embodiments of the disclosure are shown.

FIG. 1 is a schematic exploded perspective view of a display device according to an embodiment of the present disclosure.

Referring to FIG. 1, the display device according to the current embodiment includes a display substrate 100, a liquid crystal layer 200, a counter substrate 300, a backlight unit 400, a color filter CF, a first polarizing plate POL1 and a second polarizing plate POL2.

The liquid crystal layer 200 may be interposed between the display substrate 100 and the counter substrate 300. The direction in which and the degree to which liquid crystals in the liquid crystal layer 200 are oriented may vary according to the direction and intensity of an electric field formed in the liquid crystal layer 200. In the embodiment of FIG. 1, the liquid crystals of the liquid crystal layer 200 are in a horizontal alignment mode such as an in-plane switching (IPS) mode, a plane-to-line switching (PLS) mode, or a fringe field switching (FFS) mode. In a horizontal alignment mode, the display substrate 100 includes a plurality of pixel electrodes formed in a plurality of pixels defined by a plurality of scan lines and a plurality of data lines, and at least one common electrode. The orientation direction of the liquid crystals aligned horizontally in the liquid crystal layer 200 may change from a direction parallel to a plane based on a lateral electric field formed between the pixel electrodes and the at least one common electrode of the display substrate 100. Each liquid crystal molecule of the liquid crystal layer 200 may have birefringent characteristics, i.e., have different refractive indices in a long-axis direction and a short-axis direction thereof. The degree to which an optical axis of each ray of light that passes through the liquid crystal layer 200 is twisted can be adjusted according to an angle at which the liquid crystals are aligned in a plane.

Light received from the backlight unit 400 to the liquid crystal layer 200 may have been polarized in a second direction X by the first polarizing plate POL1. The liquid crystal layer 200 may twist the direction of the light polarized in the second direction X. That is, the light polarized in the second direction X may be polarized into a direction between a first direction Y and the second direction X as it passes through the liquid crystal layer 200. The second polarizing plate POL2 disposed on the counter substrate 300 may have a transmission axis aligned in the first direction Y. Of the light that passed through the liquid crystal layer 200, the second polarizing plate POL2 may transmit light of a polarization component in the first direction Y and block light of a polarization component in the second direction X.

In addition, the color filter CF may be disposed on the counter substrate 300. The color filter CF may include a red filter region which passes red light and absorbs light of other colors, a green filter region which passes green light and absorbs light of other colors, and a blue filter region which passes blue light and absorbs light of other colors.

In a display device according to a current embodiment, the display substrate 100, the liquid crystal layer 200 and the counter substrate 300 operate in a horizontal alignment mode as described above. However, embodiments of the present disclosure are not limited thereto. In some embodiments, a display panel that includes the display substrate 100, the liquid crystal layer 200 and the counter substrate 300 can also operate in a vertical alignment (VA) mode such as a super patterned vertical alignment (SPVA) mode, a multi-domain vertical alignment (MVA) mode, or a twisted nematic (TN) mode.

In addition, in FIG. 1, a display device according to a current embodiment has a structure in which the backlight unit 400, the first polarizing plate POL1, the display substrate 100, the liquid crystal layer 200, the counter substrate 300, the color filter CF and the second polarizing plate POL2 are stacked sequentially in this order. However, embodiments of the present disclosure are not limited thereto. In a present disclosure, the position of each element can be changed as long as an optical function thereof is not compromised. For example, the color filter CF can be placed under the counter substrate 300, can be placed on or under the display substrate 100, or can be embedded in each pixel of the display substrate 100. In addition, the elements of FIG. 1 can be integrated as long as the optical functions thereof are not compromised. For example, the second polarizing plate POL2, the color filter CF and the counter substrate 300 can be integrated with each other, and the first polarizing plate POL1 can be integrated into the backlight unit 400 as one optical film or can be integrally attached to a lower surface of the display substrate 100.

In a current embodiment, the first polarizing plate POL1 may be a reflective polarizing plate that can reflect some light received from the backlight unit 400 and reuse the reflected light. More specifically, s first polarizing plate POL1 according to a current embodiment may be a reflective polarizing plate containing a cholesteric liquid crystal that transmits one or more of a left-circular polarization component and a right-circular polarization component, reflects the other polarization component, and transmits the reflected light.

A reflective polarizing plate that includes a cholesteric liquid crystal layer according to an embodiment of the present disclosure will now be described in greater detail with reference to FIGS. 2 through 6.

Figure 2:
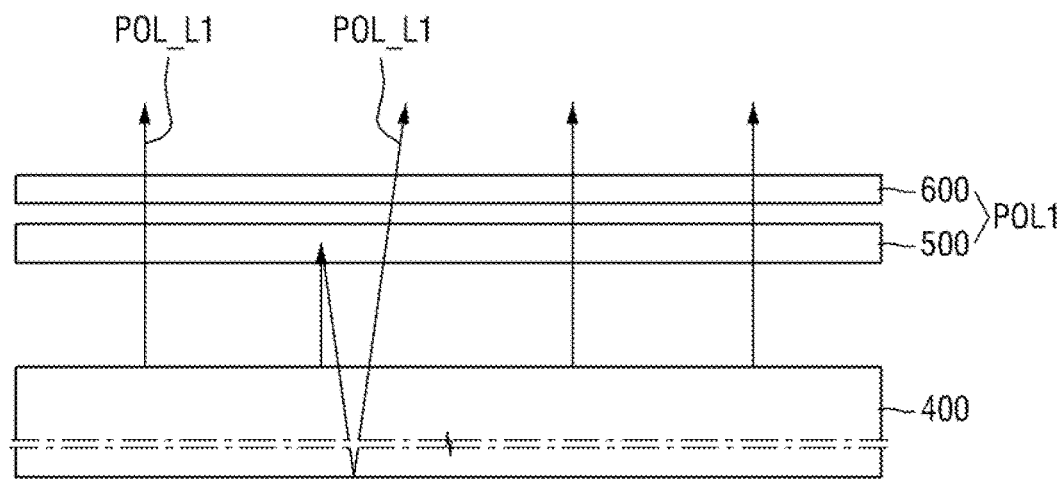
FIG. 2 is a cross-sectional view of the layered structure of a first polarizing plate which is a reflective polarizing plate according to an embodiment of the present disclosure.

FIG. 2 is a cross-sectional view illustrating the layered structure of a first polarizing plate POL1 which is a reflective polarizing plate according to an embodiment of the present disclosure.

Referring to FIG. 2, a first polarizing plate POL1 according to a current embodiment may be a reflective polarizing plate which includes a cholesteric liquid crystal layer 500 and a λ/4 compensation layer 600.

Light received from the backlight unit 400 can be interpreted as a superposition of a left-circular polarization component and a right-circular polarization component. In theory, a ratio of the left-circular polarization component and the right-circular polarization component of the light received from the backlight unit 400 may be 1:1. A cholesteric liquid crystal can reflect a component that is circularly polarized in a direction that is the same as a direction in which cholesteric liquid crystals of the cholesteric liquid crystal 500 are helically twisted, and transmit a component that is circularly polarized component in a direction different from the direction in which the cholesteric liquid crystals are helically twisted.

That is, the cholesteric liquid crystal layer 500 may transmit light that is circularly polarized in an opposite direction to the direction in which the cholesteric liquid crystals are helically twisted, and reflect light that is circularly polarized in the same direction as the direction in which the cholesteric liquid crystals are helically twisted. Here, the reflected light may be re-reflected by a reflective plate of the backlight unit 400 and provided again to the cholesteric liquid crystal layer 500.

Therefore, of light provided to the cholesteric liquid crystal layer 500, either left-circularly polarized light or right-circularly polarized light can be transmitted through the cholesteric liquid crystal layer 500. The left-circularly polarized light or the right-circularly polarized light that is transmitted through the cholesteric liquid crystal layer 500 may be expressed as a vector sum of components of two directions perpendicular to each other in a plane.

The λ/4 compensation layer 600 may form a relative phase difference between the two perpendicular components of the left-circularly polarized light or the right-circularly polarized light that transmits through the cholesteric liquid crystal layer 500. More specifically, the λ/4 compensation layer 600 may delay the phase difference between the two perpendicular components by λ/4. Here, λ, represents a wavelength of light. In white light, λ can be interpreted as a mid-band wavelength of 570 to 590 nm.

As the λ/4 compensation layer 600 delays left-circularly polarized light or right-circularly polarized light by λ/4, the left-circularly polarized light or the right-circularly polarized light may become linearly polarized light in which electric or magnetic field components oscillate in one direction in a plane.

That is, light that transmits through the λ/4 compensation layer 600 may be first linearly polarized light POL_L1 oscillating in one direction in a plane, and the first polarizing plate POL1 may provide the first linearly polarized light POL_L1 to the display substrate 100 and the liquid crystal layer 200.

A detailed configuration of the first polarizing plate POL1 of FIG. 2 will now be described with reference to FIGS. 3 through 5.

Figure 3:
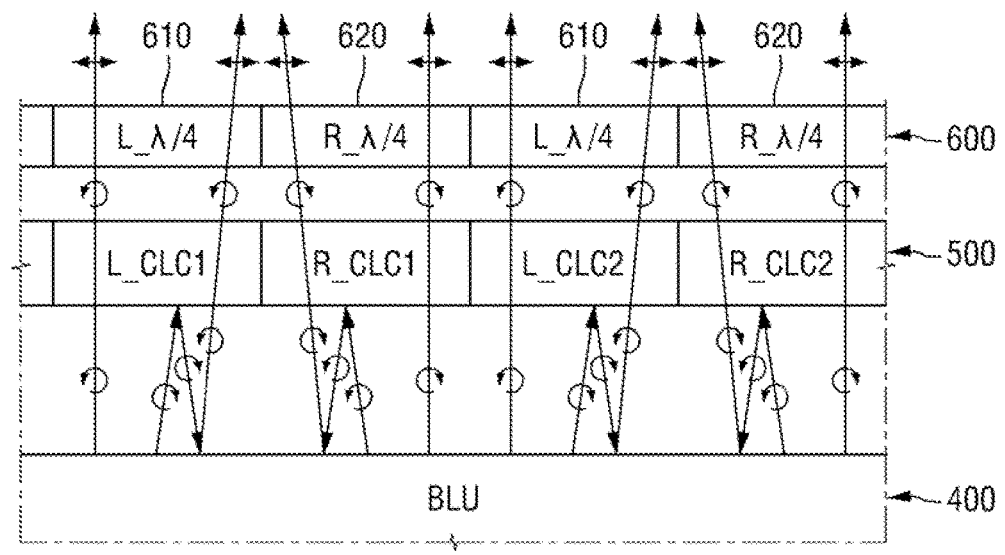
FIG. 3 is a cross-sectional view of a cholesteric liquid crystal layer and a λ/4 compensation layer of the first polarizing plate of FIG. 2 and of light transmitting through or being reflected by the cholesteric liquid crystal layer and the λ/4 compensation layer.

FIG. 3 is a cross-sectional view of the cholesteric liquid crystal layer 500 and the λ/4 compensation layer 600 of the first polarizing plate POL1 of FIG. 2, and of light transmitting through or being reflected by the cholesteric liquid crystal layer 500 and the λ/4 compensation layer 600.

Figure 4:
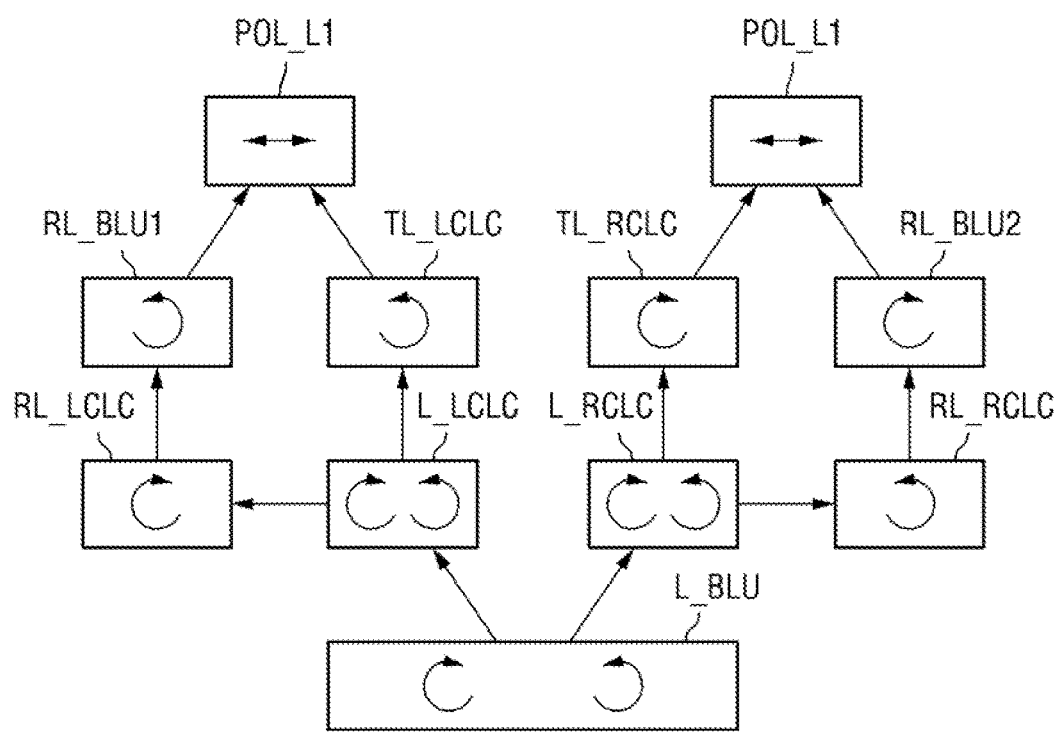
FIG. 4 is a block diagram of the polarization state of light transmitting through or reflected by the cholesteric liquid crystal layer and the λ/4 compensation layer of the first polarizing plate of FIG. 2.

FIG. 4 is a block diagram of the polarization state of light transmitting through or reflected by the cholesteric liquid crystal layer 500 and the λ/4 compensation layer 600 of the first polarizing plate POL1 of FIG. 2.

Figure 5:
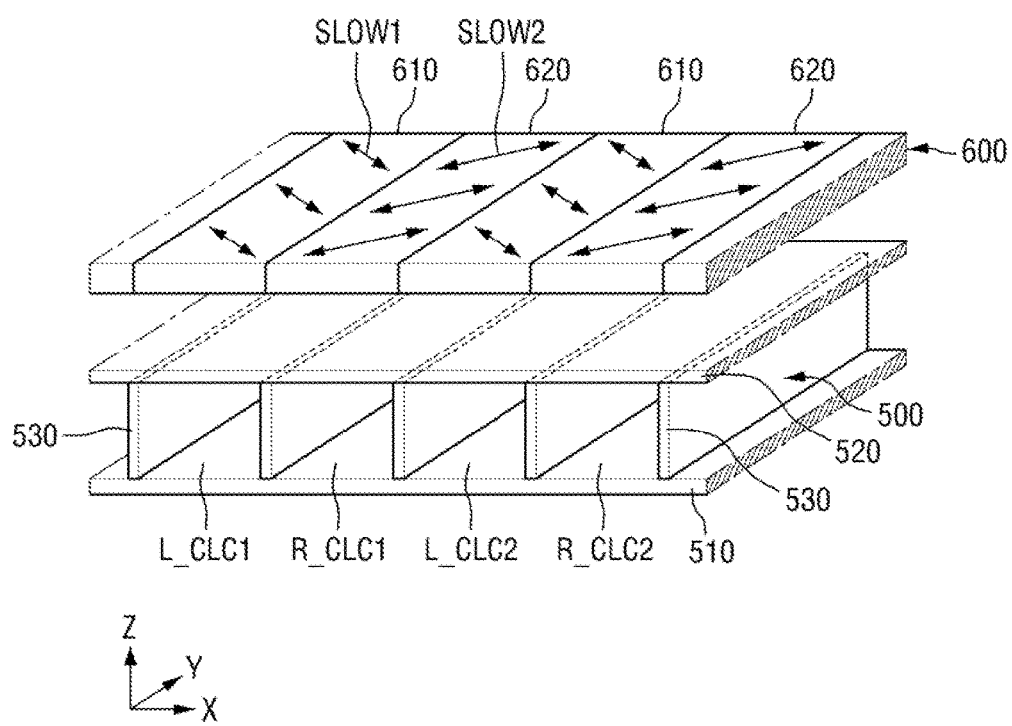
FIG. 5 is a perspective view of the cholesteric liquid crystal layer and the λ/4 compensation layer of the first polarizing plate of FIG. 2.

FIG. 5 is a perspective view of the cholesteric liquid crystal layer 500 and the λ/4 compensation layer 600 of the first polarizing plate POL1 of FIG. 2.

Referring to FIGS. 3 through 5, the cholesteric liquid crystal layer 500 may include a first left-handed circularly polarizing portion L_CLC1 which extends in the first direction Y and includes left-handed cholesteric liquid crystals, and a first right-handed circularly polarizing portion R_CLC1 which extends in the first direction Y and includes right-handed cholesteric liquid crystals.

In addition, the cholesteric liquid crystal layer 500 may include a second left-handed circularly polarizing portion L_CLC2 which extends in the first direction Y and neighbors the first right-handed circularly polarizing portion R_CLC1, and a second right-handed circularly polarizing portion R_CLC2 which extends in the first direction Y and neighbors the second left-handed circularly polarizing portion L_CLC2.

The cholestric liquid crystal layer 500 may form a stripe pattern in which the first left-handed circularly polarizing portion L_CLC1, the first right-handed circularly polarizing portion R_CLC1, the second left-handed circularly polarizing portion L_CLC2 and the second right-handed circularly polarizing portion R_CLC2 are sequentially and repeatedly arranged.

That is, in a current embodiment, the cholesteric liquid crystal layer 500 may form a stripe pattern in which a layer that includes a left-handed cholesteric liquid crystal material and a layer that includes a right-handed cholesteric liquid crystal material are repeatedly arranged along the second direction X, and light transmitting through the cholesteric liquid crystal layer 500 may include right-circularly polarized light and left-circularly polarized light repeated along the second direction X.

More specifically, the cholesteric liquid crystal layer 500 may include a lower layer 510, an upper layer 520, and a plurality of barrier ribs 530 which extend in the first direction Y and are interposed between the lower layer 510 and the upper layer 520. The barrier ribs 530 may form a plurality of liquid crystal injection spaces between the lower layer 510 and the upper layer 520. The liquid crystal injection spaces may extend in the first direction Y. A different cholesteric liquid crystal material may be injected into each of the liquid crystal injection spaces. Accordingly, the cholesteric liquid crystal layer 500 may form a stripe pattern in which a space including left-handed cholesteric liquid crystals and a space including right-handed cholesteric liquid crystals are repeated along the second direction X. In addition, cholesteric liquid crystal molecules of the cholesteric liquid crystal layer 500 may have different pitches along the second direction X.

The term "left-handed cholesteric liquid crystals," as used herein, denotes a cholesteric liquid crystal material having cholesteric liquid crystals that are helically twisted in a left or counter-clockwise direction from a helical axis, and the term "right-handed cholesteric liquid crystals," as used herein, denotes a cholesteric liquid crystal material having cholesteric liquid crystals that are helically twisted in a right or clockwise direction from the helical axis.

Cholesteric liquid crystals injected into the liquid crystal injection spaces may be twisted in different directions and have different pitches.

The $\lambda/4$ compensation layer 600 is disposed on the cholesteric liquid crystal layer 500 and includes a first $\lambda/4$ compensation pattern 610 that extends in the first direction Y and overlaps the first left-handed circularly polarizing portion L_CLC1, and a second $\lambda/4$ compensation pattern 620 that extends in the first direction Y and overlaps the first right-handed circularly polarizing portion R_CLC1.

Here, the $\lambda/4$ compensation pattern 610 may include a first slow axis SLOW1, and the second $\lambda/4$ compensation pattern 620 may include a second slow axis SLOW2. Each of the first slow axis SLOW1 and the second slow axis SLOW2 may be an axis that delays a phase of a parallel component relatively more. That is, of light that passes through the $\lambda/4$ compensation layer 600, light of a component parallel to each of the first slow axis SLOW1 and the second slow axis SLOW2 may be phase-delayed by $\lambda/4$ as compared with light of a component perpendicular to each of the first slow axis SLOW1 and the second slow axis SLOW2.

Accordingly, left-circularly polarized light or right-circularly polarized light that transmits through the first $\lambda/4$ compensation pattern 610 or the second $\lambda/4$ compensation pattern 620 may be converted into linearly polarized light POL_L1. In particular, the first slow axis SLOW1 and the second slow axis SLOW2 of the first $\lambda/4$ compensation pattern 610 or the second $\lambda/4$ compensation pattern 620 may be oriented perpendicular to each other, such that left-circularly polarized light or right-circularly polarized light transmitting through the first $\lambda/4$ compensation pattern 610 or the second $\lambda/4$ compensation pattern 620 can be converted into linearly polarized light POL_L1 that is aligned in one direction.

Changes in the polarization state of light are illustrated in more detail in FIG. 4. Referring to FIG. 4, light L_BLU received from the backlight unit 400 may include both a left-circular polarization component and a right-circular polarization component. The light L_BLU may be provided to those portions of the cholesteric liquid crystal layer 500 that include left-handed cholesteric liquid crystal material, that is, the first left-handed circularly polarizing portion L_CLC1 and the second left-handed circularly polarizing portion L_CLC2. The light L_LCLC provided to the first left-handed circularly polarizing portion L_CLC1 and the second left-handed circularly polarizing portion L_CLC2 may include both a left-circular polarization component and a right-circular polarization component.

Of the light L_LCLC, light that is right-circularly polarized in a direction opposite to the direction in which left-handed cholesteric liquid crystals are twisted may transmit through the first left-handed circularly polarizing portion L_CLC1 and the second left-handed circularly polarizing portion L_CLC2. The right-circularly polarized light TL_LCLC that transmits through the first left-handed circularly polarizing portion L_CLC1 and the second left-handed circularly polarizing portion L_CLC2 may be provided to the first $\lambda/4$ compensation pattern 610.

In addition, of the light L_LCLC, light that is left-circularly polarized in the same direction as the direction in which the left-handed cholesteric liquid crystals are twisted may be reflected by the left-handed cholesteric liquid crystal material, and the light RL_LCLC reflected by the left-handed cholesteric liquid crystal material may be left-circularly polarized light. The reflected left-circularly polarized light RL_LCLC may be reflected again by the reflective plate of the backlight unit 400. The specular reflection by the reflective plate of the reflected left-circularly polarized light RL_LCLC may change the reflected left-circularly polarized light RL_LCLC into right-circularly polarized light RL_BLU1.

Since the right-circularly polarized light RL_BLU1 can transmit through the first left-handed circularly polarizing portion L_CLC1 and the second left-handed circularly polarizing portion L_CLC2, it may be provided to the first $\lambda/4$ compensation pattern 610 via the first left-handed circularly polarizing portion L_CLC1 and the second left-handed circularly polarizing portion L_CLC2.

The right-circularly polarized light RL_BLU1 provided to the first $\lambda/4$ compensation pattern 610 may be phase-delayed and thus converted into first linearly polarized light POL_L1 that oscillates in a direction at an angle of 45 degrees with respect to the first slow axis SLOW1.

In addition, light L_BLU received from the backlight unit 400 may be provided to those portions of the cholesteric liquid crystal layer 500 that include right-handed cholesteric liquid crystal material, that is, the first right-handed circularly polarizing portion R_CLC1 and the second right-handed circularly polarizing portion R_CLC2. The light L_RCLC provided to the first right-handed circularly polarizing portion R_CLC1 and the second right-handed circularly polarizing portion R_CLC2 may include both a left-circular polarization component and a right-circular polarization component.

Of the light L_RCLC, light that is left-circularly polarized in an direction opposite to the direction in which right-handed cholesteric liquid crystals are twisted may transmit through the first right-handed circularly polarizing portion R_CLC1 and the second right-handed circularly polarizing portion R_CLC2. The left-circularly polarized light TL_RCLC that transmits through the first right-handed circularly polarizing portion R_CLC1 and the second right-handed circularly polarizing portion R_CLC2 may be provided to the second $\lambda/4$ compensation pattern 620.

In addition, of the light L_RCLC, light that is right-circularly polarized in the same direction as the direction in which the right-handed cholesteric liquid crystals are twisted may be reflected by the right-handed cholesteric liquid crystal material, and the light RL_RCLC reflected by the right-handed cholesteric liquid crystal material may be right-circularly polarized light. The reflected right-circularly polarized light RL_RCLC may be reflected again by the reflective plate of the backlight unit 400. The specular reflection by the reflective plate of the reflected right-circularly polarized light RL_RCLC may change the reflected right-circularly polarized light RL_RCLC into left-circularly polarized light RL_BLU2.

Since the left-circularly polarized light RL_BLU2 can transmit through the first right-handed circularly polarizing portion R_CLC1 and the second right-handed circularly polarizing portion R_CLC2, it may be provided to the second λ/4 compensation pattern 620 via the first right-handed circularly polarizing portion R_CLC1 and the second right-handed circularly polarizing portion R_CLC2.

The left-circularly polarized light RL_BLU2 provided to the second λ/4 compensation pattern 620 may be phase-delayed and thus converted into first linearly polarized light POL_L1 that oscillates in a direction at an angle of 45 degrees with respect to the second slow axis SLOW2.

Here, the first slow axis SLOW1 of the first λ/4 compensation pattern 610 and the second slow axis SLOW2 of the second λ/4 compensation pattern 620 may be perpendicular to each other, and right-circularly polarized light and left-circularly polarized light may be converted into first linearly polarized light POL_L1 that oscillates in a direction as the light transmits through the first λ/4 compensation pattern 610 and the second λ/4 compensation pattern 620, respectively.

Figure 6:
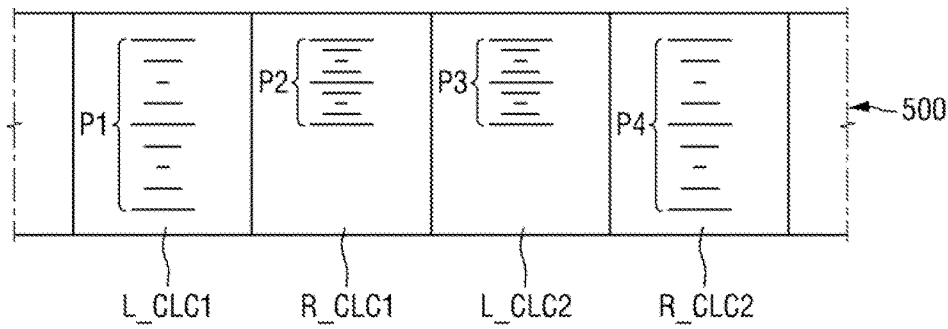
FIG. 6 is a cross-sectional view of cholesteric liquid crystal materials having different pitches and injected into the cholesteric liquid crystal layer of the first polarizing plate of FIG. 2.

FIG. 6 is a cross-sectional view of cholesteric liquid crystal materials having different pitches and injected into the cholesteric liquid crystal layer 500 of the first polarizing plate POL1 of FIG. 2.

Referring to FIG. 6, in a current embodiment, a left-handed cholesteric liquid crystal material having a first pitch P1 may be injected into the first left-handed circularly polarizing portion L_CLC1, a right-handed cholesteric liquid crystal material having a second pitch P2 may be injected into the first right-handed circularly polarizing portion R_CLC1, a left-handed cholesteric liquid crystal material having a third pitch P3 may be injected into the second left-handed circularly polarizing portion L_CLC2, and a right-handed cholesteric liquid crystal material having a fourth pitch P4 may be injected into the second right-handed circularly polarizing portion R_CLC2.

In a current embodiment, the first pitch P1 and the fourth pitch P4 may be substantially the same, and the second pitch P2 and the third pitch P3 may be substantially the same. In addition, the first pitch P1 and the fourth pitch P4 may be longer than the second pitch P2 and the third pitch P3.

That is, the pitches P1 and P4 of cholesteric liquid crystals included in the first left-handed circularly polarizing portion L_CLC1 and the second right-handed circularly polarizing portion R_CLC2 may be longer than the pitches P2 and P3 of cholesteric liquid crystals included in the first right-handed circularly polarizing portion R_CLC1 and the second left-handed circularly polarizing portion L_CLC2.

Strictly speaking, a cholesteric liquid crystal may reflect part of a component that is circularly polarized in the same direction as the direction in which a helix of the liquid crystal is twisted, and the reflection range may be represented by $n_e \cdot P \sim n_o \cdot P$, where $n_e$ denotes an abnormal refractive index of a birefringent cholesteric liquid crystal, $n_o$ denotes a normal refractive index of the cholesteric liquid crystal, and P denotes a helical pitch of the cholesteric liquid crystal. That is, a central wavelength of light reflected by the cholesteric liquid crystal can be represented by $((n_e+n_o)/2) \cdot P$, and light in a reflection wavelength range of $(n_e-n_o) \cdot P$ from this central wavelength can be reflected.

It may be desirable to adjust physical properties of cholesteric liquid crystals, such as pitch, abnormal refractive index and normal refractive index, so that all light of a particular circular polarization component having a wavelength in a visible region may be reflected. In particular, to achieve broadband reflection, a cholesteric liquid crystal material should have a large difference between the abnormal refractive index and the normal refractive index. However, while pitches of cholesteric liquid crystals can be adjusted by controlling process variables, the abnormal and normal refractive indices of the cholesteric liquid crystals are unique characteristics of the cholesteric liquid crystals, and are thus not susceptible to adjustment.

A reflective polarizing film implemented using a cholesteric liquid crystal material having one pitch may reflect light whose wavelength is close to a central reflection wavelength corresponding to the pitch, and the reflected light may mix with light of other circular polarization components that pass through cholesteric liquid crystals. Therefore, the proportion of light passing through the cholesteric liquid crystal layer 500 whose wavelength is close to the central reflection wavelength of the cholesteric liquid crystal material may increase. This may increase the amount of light in a wavelength range around the central reflection wavelength, resulting in an increased color brightness of pixels in a display image.

That is, wavelength-selective reflection of the cholesteric liquid crystal material can deflect or shift light to be provided to a display substrate to a corresponding wavelength, thereby degrading display quality of a display device.

For example, in a current embodiment, the first left-handed circularly polarizing portion L_CLC1 includes cholesteric liquid crystal material having the first pitch P1. Therefore, light reflected and reused by the first left-handed circularly polarizing portion L_CLC1 may have a central wavelength of $((n_e+n_o)/2) \cdot P1$. In addition, light provided to the first λ/4 compensation pattern 610 after transmitting through the first left-handed circularly polarizing portion L_CLC1 may have a high proportion of light in a wavelength range corresponding to $((n_e+n_o)/2) \cdot P1$.

In a current embodiment, the first right-handed circularly polarizing portion R_CLC1 includes cholesteric liquid crystal material having the second pitch P2. Therefore, light reflected and reused by the first right-handed circularly polarizing portion R_CLC1 may have a central wavelength of $((n_e+n_o)/2) \cdot P2$. In addition, light provided to the second λ/4 compensation pattern 620 after transmitting through the first right-handed circularly polarizing portion R_CLC1 may have a high proportion of light in a wavelength range corresponding to $((n_e+n_o)/2) \cdot P2$.

Therefore, light provided to the display substrate 100 after transmitting through the first λ/4 compensation pattern 610 and the second λ/4 compensation pattern 620 may be standardized in a wavelength range of $((n_e+n_o)/2) \cdot P1 \sim ((n_e+n_o)/2) \cdot P2$. For example, assuming that P1>P2, that $((n_e+n_o)/2) \cdot P1$ corresponds to a wavelength of a bluish light in a short wavelength range of visible light, and that $((n_e+n_o)/2) \cdot P2$ corresponds to a wavelength of reddish light in a long wavelength range of visible light, light provided to the display substrate 100 after transmitting through the first λ/4 compensation pattern 610 and the second λ/4 compensation pattern 620 may be standardized over the entire wavelength range of visible light. Accordingly, the deflection or shift of the color gamut of light provided to the display substrate 100 can be substantially eliminated.

Figure 7:
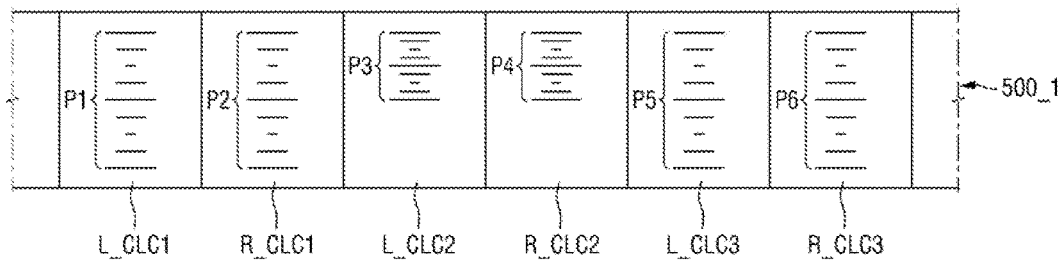
FIG. 7 is a cross-sectional view of cholestetic liquid crystal materials having different pitches and injected into a cholesteric liquid crystal layer of a first polarizing plate according to another embodiment of the present disclosure.

FIG. 7 is a cross-sectional view of cholesteric liquid crystal materials having different pitches and injected into a cholesteric liquid crystal layer 500_1 of a first polarizing plate according to another embodiment of the present disclosure.

Referring to FIG. 7, in the cholesteric liquid crystal layer 500_1 according to a current embodiment, a left-handed cholesteric liquid crystal material having a first pitch P1 may be injected into a first left-handed circularly polarizing portion L_CLC1, a right-handed cholesteric liquid crystal material having a second pitch P2 may be injected into a first right-handed circularly polarizing portion R_CLC1, a left-handed cholesteric liquid crystal material having a third pitch P3 may be injected into a second left-handed circularly polarizing portion L_CLC2, a right-handed cholesteric liquid crystal material having a fourth pitch P4 may be injected into a second right-handed circularly polarizing portion R_CLC2, a left-handed cholesteric liquid crystal material having a fifth pitch P5 may be injected into a third left-handed polarizing portion L_CLC3, and a right-handed cholesteric liquid crystal material having a sixth pitch P6 may be injected into a third right-handed polarizing portion R_CLC3.

In an embodiment of FIG. 7, the first pitch P1 and the second pitch P2 may be substantially the same, and the third pitch P3 and the fourth pitch P4 may be substantially the same. The third left-handed polarizing portion L_CLC3 and the third right-handed polarizing portion R_CLC3 may be substantially the same as the first left-handed circularly polarizing portion L_CLC1 and the first right-handed circularly polarizing portion R_CLC1, respectively. The fifth pitch P5 and the sixth pitch P6 may be the same as the first pitch P1 and the second pitch P2, respectively.

In addition, the first pitch P1 and the second pitch P2 may be longer than the third pitch P2 and the fourth pitch P4.

That is, the pitches P1 and P2 of cholesteric liquid crystals included in the first left-handed circularly polarizing portion L_CLC1 and the first right-handed circularly polarizing portion R_CLC1 may be longer than the pitches P3 and P4 of cholesteric liquid crystals included in the second left-handed circularly polarizing portion L_CLC2 and the second right-handed circularly polarizing portion R_CLC2.

Figure 8:
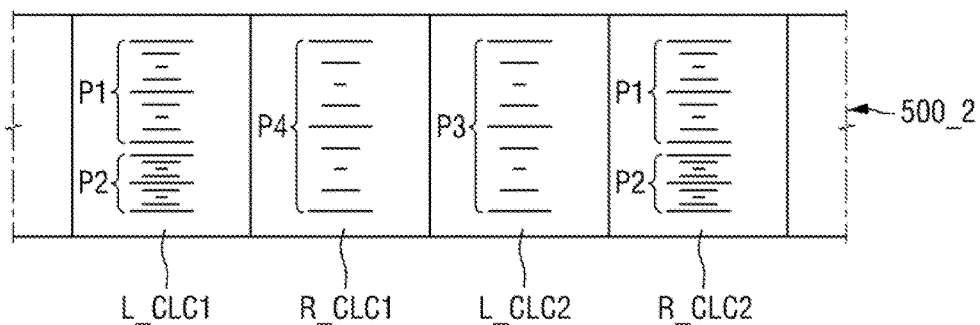
FIG. 8 is a cross-sectional view of cholestetic liquid crystal materials having different pitches and injected into a cholesteric liquid crystal layer of a first polarizing plate according to another embodiment of the present disclosure.

FIG. 8 is a cross-sectional view of cholestetic liquid crystal materials having different pitches and injected into a cholesteric liquid crystal layer 500_2 of a first polarizing plate according to another embodiment of the present disclosure.

Referring to FIG. 8, in the cholesteric liquid crystal layer 500_2 according to a current embodiment, a left-handed cholesteric liquid crystal material having a first pitch P1 and a second pitch P2 may be injected into a first left-handed circularly polarizing portion L_CLC1, a right-handed cholesteric liquid crystal material having a third pitch P3 may be injected into a first right-handed circularly polarizing portion R_CLC1, a left-handed cholesteric liquid crystal material having a fourth pitch P4 may be injected into a second left-handed circularly polarizing portion L_CLC2, and a right-handed cholesteric liquid crystal material having the first pitch P1 and the second pitch P2 may be injected into a second right-handed circularly polarizing portion R_CLC2.

In the embodiment of FIG. 8, the first pitch P1 may be substantially longer than the second pitch P2, and the third pitch P3 may be substantially longer than the first pitch P1.

That is, in the current embodiment, cholesteric liquid crystal materials having different pitches may be injected into one or more injection spaces of the cholesteric liquid crystal layer 500_2. In the first left-handed circularly polarizing portion L_CLC1 and the second right-handed circularly polarizing portion R_CLC2 into which the cholesteric liquid crystal materials having different pitches are injected, left-circularly polarized light or right-circularly polarized light of central wavelengths corresponding to the first pitch P1 and the second pitch P2 may be reflected. Therefore, light in a wider wavelength range can be reflected by the cholesteric liquid crystal layer 500_2, and the reflection efficiency of a reflective polarizing plate that includes the cholesteric liquid crystal layer 500_2 can be improved.

Figure 9:
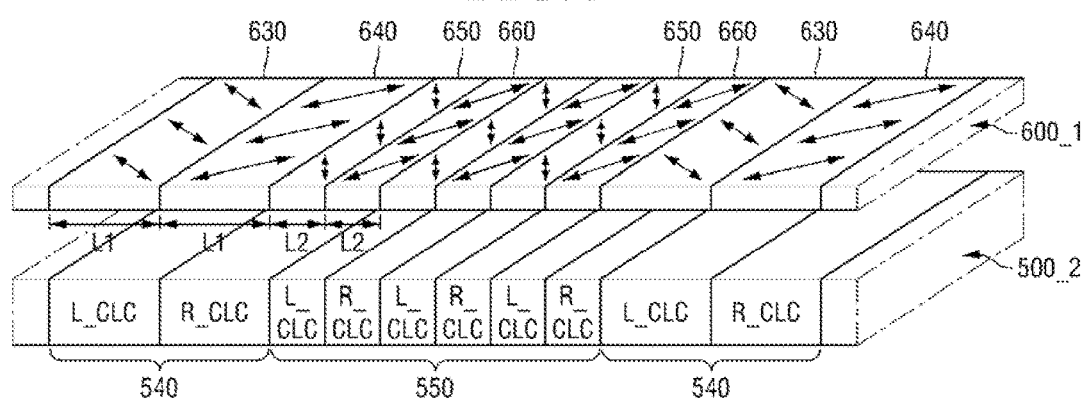
FIG. 9 is a perspective view of a cholesteric liquid crystal layer and a λ/4 compensation layer of a first polarizing plate according to another embodiment of the present disclosure.

FIG. 9 is a perspective view of a cholesteric liquid crystal layer 500_3 and a λ/4 compensation layer 600_1 of a first polarizing plate according to another embodiment of the present disclosure.

Referring to FIG. 9, the cholesteric liquid crystal layer 500_3 of a first polarizing plate according to a current embodiment may include a first pattern region 540 and a second pattern region 550. The first pattern region 540 may include a left-handed polarizing portion L_CLC and a right-handed polarizing portion R_CLC which have a first width L1, and the second pattern region 550 may include a left-handed polarizing portion L_CLC and a right-handed polarizing portion R_CLC which have a second width L2.

In addition, in a current embodiment, the λ/4 compensation layer 600_1 may include a third λ/4 compensation pattern 630, a fourth λ/4 compensation pattern 640, a fifth λ/4 compensation pattern 650, and a sixth λ/4 compensation pattern 660.

The third λ/4 compensation pattern 630 and the fourth λ/4 compensation pattern 640 may respectively overlap the left-handed polarizing portion L_CLC and the right-handed polarizing portion R_CLC of the first pattern region 540 and each have the first width L1.

The fifth λ/4 compensation pattern 650 and the sixth λ/4 compensation pattern 660 may respectively overlap the left-handed polarizing portion L_CLC and the right-handed polarizing portion R_CLC of the second pattern region 550 and each have the second width L2.

That is, in a current embodiment, the left-handed polarizing portions L_CLC and the right-handed polarizing portions R_CLC that comprise the cholesteric liquid crystal layer 500_3 may have different widths along the plane of the cholesteric liquid crystal layer 500_3. Accordingly, the λ/4 compensation patterns 630 through 660 which respectively overlap the left-handed and right-handed polarizing portions L_CLC and R_CLC may have different widths along the plane of the λ/4 compensation layer 600_1.

Embodiments of the present disclosure can enhance display quality of a liquid crystal display (LCD) while improving luminance of the LCD.

However, effects of embodiments of the present disclosure are not restricted to those set forth above. The above and other effects of embodiments of the present disclosure will become more apparent to one of daily skill in the art to which the present disclosure pertains by referencing the claims.

What is claimed is:

1. A cholesteric liquid crystal reflective polarizing plate comprising:
    a cholesteric liquid crystal layer; and
    a λ/4 compensation layer disposed on the cholesteric liquid crystal layer,
    wherein the cholesteric liquid crystal layer comprises
        a first left-handed circularly polarizing portion which extends in a first direction and comprises a left-handed cholesteric liquid crystal material that comprises left-handed cholesteric liquid crystal molecules having a first pitch, and a first right-handed circularly polarizing portion which extends in the first direction adjacent to the first left-handed circularly polarizing portion and comprises a right-handed cholesteric liquid crystal material that comprises right-handed cholesteric liquid crystal molecules having a second pitch, wherein the first pitch is different from the second pitch, and the λ/4 compensation layer comprises a first λ/4 compensation pattern which extends in the first direction and overlaps the first left-handed circularly polarizing portion, and a second λ/4 compensation pattern which extends in the first direction adjacent to the first λ/4 compensation pattern and overlaps the first right-handed circularly polarizing portion, wherein the first λ/4 compensation pattern and the second λ/4 compensation pattern have slow axes that are perpendicular to each other.

2. The polarizing plate of claim 1, wherein the cholesteric liquid crystal layer further comprises a second left-handed circularly polarizing portion which extends in the first direction adjacent to the first right-handed circularly polarizing portion, and a second right-handed circularly polarizing portion which extends in the first direction adjacent to the second left-handed circularly polarizing portion, wherein the second left-handed circularly polarizing portion comprises left-handed cholesteric liquid crystal molecules having a third pitch, and the second right-handed circularly polarizing portion comprises right-handed cholesteric liquid crystal molecules having a fourth pitch.

3. The polarizing plate of claim 2, wherein the first pitch is the same as the fourth pitch, the second pitch is the same as the third pitch.

4. The polarizing plate of claim 1, wherein the cholesteric liquid crystal layer comprises a lower layer, an upper layer, and a plurality of barrier ribs which extend in the first direction between the lower layer and the upper layer.

5. The polarizing plate of claim 4, wherein the lower layer, the upper layer and the barrier ribs form a plurality of liquid crystal injection spaces, and different cholesteric liquid crystal materials are injected into two or more of the liquid crystal injection spaces.

6. The polarizing plate of claim 1, wherein light that transmits through the first left-handed circularly polarizing portion is right-circularly polarized light, and light that transmits through the first right-handed circularly polarizing portion is left-circularly polarized light, wherein the right-circularly polarized light is provided to the first λ/4 compensation pattern, and the left-circularly polarized light is provided to the second λ/4 compensation pattern, wherein light that transmits through the first λ/4 compensation pattern and light that transmits through the second λ/4 compensation pattern are linearly polarized light that oscillate in a same direction.

7. The polarizing plate of claim 6, wherein the direction in which the linearly polarized light oscillates forms a 45 degree angle with respect to the slow axes of the first λ/4 compensation pattern and the second λ/4 compensation pattern.

8. The polarizing plate of claim 1, wherein the cholesteric liquid crystal layer further comprises a second left-handed circularly polarizing portion which extends in the first direction adjacent to the first right-handed circularly polarizing portion, and a second right-handed circularly polarizing portion which extends in the first direction adjacent to the second left-handed circularly polarizing portion, wherein each of the first left-handed circularly polarizing portion and the first right-handed circularly polarizing portion has a first width, and each of the second left-handed circularly polarizing portion and the second right-handed circularly polarizing portion has a second width, wherein the first width and the second width are different.

9. A liquid crystal display (LCD) comprising:

a backlight unit configured to provide light having a mixture of a left-circularly polarized component and a right-circularly polarized component;

a first polarizing plate disposed on the backlight unit;

a display substrate disposed on the first polarizing plate;

a liquid crystal layer disposed on the display substrate;

a counter substrate disposed on the liquid crystal layer; and a second polarizing plate disposed on the counter substrate, wherein the first polarizing plate comprises a cholesteric liquid crystal layer and a λ/4 compensation layer disposed on the cholesteric liquid crystal layer, wherein the cholesteric liquid crystal layer comprises a first left-handed circularly polarizing portion which extends in a first direction and comprises a left-handed cholesteric liquid crystal material that comprises left-handed cholesteric liquid crystal molecules having a first pitch, and a first right-handed circularly polarizing portion which extends in the first direction adjacent to the first left-handed circularly polarizing portion and comprises a right-handed cholesteric liquid crystal material that comprises right-handed cholesteric liquid crystal molecules having a second pitch, wherein the first pitch is different from the second pitch, and the λ/4 compensation layer comprises a first λ/4 compensation pattern which extends in the first direction and overlaps the first left-handed circularly polarizing portion, and a second λ/4 compensation pattern which extends in the first direction adjacent to the first λ/4 compensation pattern and overlaps the first right-handed circularly polarizing portion, wherein the first λ/4 compensation pattern and the second λ/4 compensation pattern have slow axes that are perpendicular to each other.

10. The LCD of claim 9, wherein the cholesteric liquid crystal layer comprises a lower layer, an upper layer, and a plurality of barrier ribs which extend in the first direction between the lower layer and the upper layer.

11. The LCD of claim 10, wherein the lower layer, the upper layer and the barrier ribs form a plurality of liquid crystal injection spaces, and different cholesteric liquid crystal materials are injected into two or more of the liquid crystal injection spaces.

12. The LCD of claim 9, wherein light that transmits through the first left-handed circularly polarizing portion is right-circularly polarized light, and light that transmits through the first right-handed circularly polarizing portion is left-circularly polarized light, wherein the right-circularly polarized light is provided to the first λ/4 compensation pattern, and
the left-circularly polarized light is provided to the second λ/4 compensation pattern,
wherein light that transmits through the first λ/4 compensation pattern and light that transmits through the second λ/4 compensation pattern are linearly polarized light that oscillate in a same direction.

* * * * *